Jan. 5, 1943.  D. A. GINSBURG  2,307,036

BUSINESS TRANSACTION STATIONERY

Filed June 12, 1941

Patented Jan. 5, 1943

2,307,036

UNITED STATES PATENT OFFICE 2,307,036

BUSINESS TRANSACTION STATIONERY

David A. Ginsburg, Philadelphia, Pa., assignor to The Standard Register Company, Dayton, Ohio, a corporation of Ohio Application June 12, 1941, Serial No. 397,693

9 Claims. (Cl. 282—21)

This invention pertains to business stationery and forms for recording business transactions, manufacturing operations, accounting and the like, and more particularly to continuous series connected form stationery for use with recording and punching apparatus by which the character and value of business transactions, nature of the operations, or other data recorded thereon may be permanently and indelibly identified.

For illustrative purpose, but with no intent to unduly limit or restrict the scope or application of the invention, it is herein shown and described as a part of a return goods system for use in department stores, for which it is especially desirable. It is to be understood that with proper designation and number of the different record areas stationery embodying the present inventive idea may be readily adapted to other purposes and systems, as for example, stock distribution and storage records, manufacturing processes and operations, communication purposes, and the like.

The object of the invention is to provide stationery, preferably but not necessarily of manifolding style for producing plural copies of record indicia having thereon one or more series of punch receiving areas, each of which is apportioned to a particular transaction, operation, class, or valuation, or other characterization to be permanently designated and an associated inscription receiving area to receive written or imprinted descriptive matter further identifying the transaction or operation.

A further object of the invention is to provide such punch receiving areas of distinctive color by which punch holes therein will be more easily discernible and readily observed, thus minimizing mistakes.

A further feature of the invention is the provision of strip feeding configurations for engagement of a feeding device which are disposed in definite prescribed relation with the punch receiving areas, whereby the proper location of the identifying punch hole within such area is insured.

A further object of the invention is to minimize tampering and prevent subsequent change of records and render visible attempts to do so.

A further object of the invention is to provide business transaction stationery having the advantageous structural features and inherent meritorious characteristics and involving the mode of operation and use herein mentioned.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawing.

In the drawing.

Like parts are indicated by similar characters of reference throughout the several views.

Figure 1:
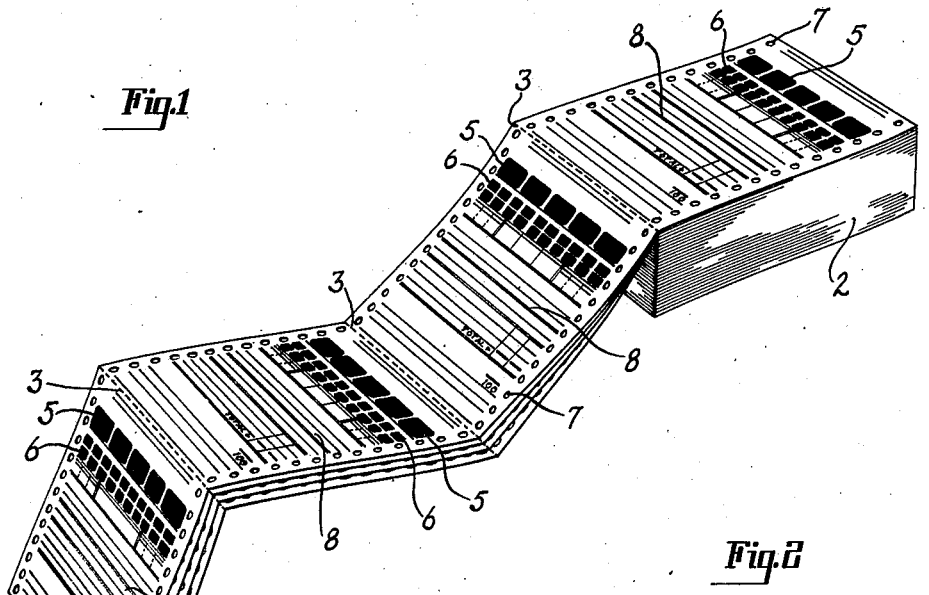
Fig. 1 is a perspective view of a packet of multi-part manifolding business transaction record forms embodying the present invention.

While the present invention may be applied to original sales slips for identifying merchandise when sold and the value thereof, and permanently indicating whether the sale is for cash, charge, C. O. D., or otherwise, and may be applied to production records, for indicating mechanical operations performed or to be performed, and by whom, and is applicable to stock accounting for indicating character and quantity of materials and analogous record purposes, it is herein illustrated as embodied in a returned goods record form identifying the character of refund and the value of the returned goods or amount refunded.

In department store operation, the problem of returned goods with the necessary credits or refunds and return of the goods to active stock is one of considerable difficulty and entails possible losses which necessitate unimpeachable records of all transactions of this character, which are afforded by the present special stationery.

The present stationery is intended for use in an autographic register having cooperating punching mechanism such as is disclosed in copending application Serial No. 250,802, filed January 13, 1939, equipped with punches properly located and sufficient in number to agree with the punch receiving spaces of the forms. The present stationery is preferably, although not necessarily, provided in continuous strips 1, which are interfolded into a supply pack 2. The strips are divisible at longitudinally spaced intervals on transverse weakened lines 3—3 into individual sheets or slips 4. For manifolding purposes the plural strips 1 are superposed one upon another, and the data inscribed upon the topmost or original record strip is transferred to underlying strips by interleaved transfer or carbon material. The transfer material may be either continuous strips of "one time" carbon, or may be sheets or transverse strips of transfer material interleaved between the record strips only at the writing position.

In the particular arrangement of the record sheets or slips 4 herein illustrated, there is provided across the top of the form a series of punch receiving blocks or spaces 5 apportioned to different transactions, including "cash credit," "charge credit," "C. O. D. credit," "merchandise credit" and "letter of credit." Immediately beneath the group of transaction spaces 5 is a further group of spaces 6 bearing characters indicative of values, to wit, "1," "3," "5," "10," "15," "20," "35," "50," etc., which in the present instance represent dollar values. The particular transaction and the value thereof are indicated by punching the corresponding spaces or blocks, as shown at 7.

In order that there may be contrast between the punched out area and the surrounding space or block, so that the punch mark may be more easily seen, the blocks or spaces 5 and 6 are colored. In practice, these are printed black, although if desired they may be variously colored with a different color for each transaction or for different values.

Likewise, when used to identify original sales records, the spaces 5 may present "cash," "charge," "C. O. D.," etc., and the spaces 6 be utilized as described to indicate the value of merchandise sold. If desired, an additional group of spaces may be provided for identification of the sales person by whom the transaction was made.

Obviously, if used for other purposes than as sales records or for returned goods accounting, as for instance for factory records, the spaces 5 may be utilized to identify different mechanical operations, as forging, planing, boring, grinding, etc., or they may designate different parts of a product. In shoe manufacture, such spaces may be utilized to identify operation upon the sole, heel, counter, lining, eyelets, etc., in which case the second group of spaces 6 may serve to identify particular operators.

Below the groups of punch receiving spaces or blocks 5 and 6 is an inscription receiving area 8 to receive written or imprinted data descriptive of the transaction or operation. This space also receives names, addresses, and signatures. In the present instance, there is provided in such inscription receiving area 8 a space for the name and address of the person to whom the returned goods item is to be credited and those of the party making the return of the goods and the reasons for so doing, and for the signature of the person receiving the goods.

Figure 2:
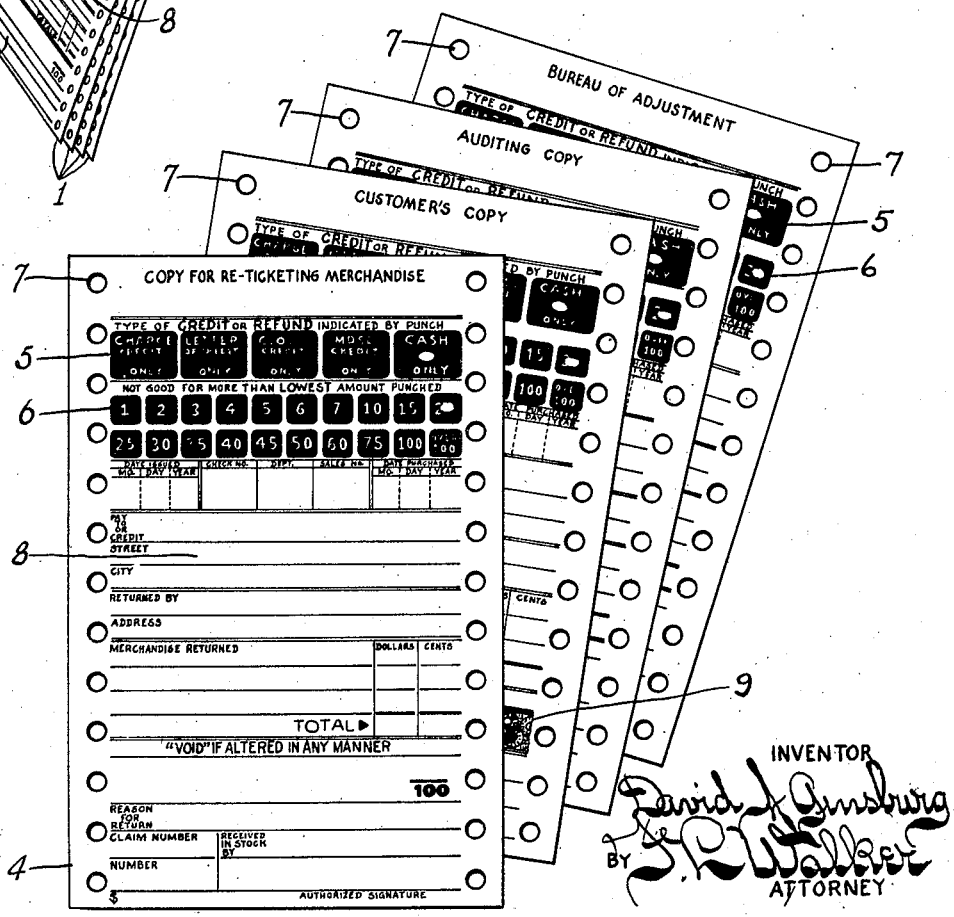
Fig. 2 illustrates a set of plural detached record forms especially applicable to a returned goods system for a department store.

As shown in Fig. 2, the record slips are made in multiple and for a returned goods system include a merchandise reticketing copy for use of the stock department, a customer's copy which serves as a receipt for the returned goods, an auditing copy for the accounting department, and a record copy for the bureau of adjustments. The use to which different copies may be applied will vary in accordance with the character of the business and the nature of the transaction or operations to be identified on such copies.

To minimize tampering and attempts at alteration, the space on one or more copies adapted to receive the written amount of the transaction may be imprinted with a safety pantagraph design, as at 9, or provided with other surface which will readily disclose erasures thereon.

The punch holes in the spaces or blocks 5 and 6 may be employed not only for visual identification, but may also be utilized for sorting purposes by passing them through a conventional pneumatic or electrically operated sorting machine. Such machine operates upon the punched sheets or slips to classify together all slips having punch holes in like positions.

For use in such sorting apparatus and also for convenient visual selection, it is quite desirable that the punch marks be accurately located in the spaces or blocks. To insure such accuracy and registry of the spaces or blocks and also the inscription areas upon different superposed sheets with each other, and to present the registered areas thereof exactly in punch receiving position, the strips 1 of series connected detachable forms are marginally punched at 10 for engagement therewith of a positive pin type feeding device with which the register in which the stationery is to be used is equipped. The marginal feed holes 10 of each succeeding sheet or form are in identical relation with the identification spaces 5, 6 and 7 of the several forms or sheets 4. Consequently, the engagement of the pin type feeding devices in the holes 10 of the several strips insures accurate registry and alignment of the forms with each other and with the punches.

It is to be understood that while the group of spaces 5 are disposed at the top of each form and the group of spaces 6 are located intermediate the first group of spaces and the inscription area 7, these areas may be variously arranged. The arrangement of identification areas may be inverted with the spaces or blocks 5 and 6 at the bottom, or these may be transposed in either location with the group of spaces 6 above the group of spaces 5. As an alternative, these groups of spaces 5 and 6 may be vertically arranged along either margin of the sheets. It is to be therefore understood that the particular relation of such area is not essential.

The present stationery forms an essential part of a system of credit records or returned goods accounting for department stores, supply depots, warehouse distribution, and the like which necessitates multiple records of goods returned or exchanged and the values thereof.

For convenience and rapidity of operation the forms are arranged in strips of continuous series connected printed record slips or sheets from which succeeding forms are detached as rapidly as they are used. This obviates the necessity of inserting individual forms for such transaction, and the supply of record material is always ready with the next form or set of forms in position for instant use. Since modern commercial methods necessitate that duplicate copies be provided for accounting, stock room, and file or other purposes, and that an additional copy be given to the customer, the present strips of series connected forms are superposed one upon another with interleaved carbon for duplication of written records. Time is the essence of such credit transactions both in making the records and in subsequently auditing or interpreting the copies thereof. Likewise permanency or indelibility and protection against tampering and change of the recorded data is an essential requirement. To this end the record is quickly and unalterably produced by punching the record sheet in prescribed areas to indicate the character of the transaction and the approximate money value of the goods involved. In order that the punching equipment may not interfere with the inscription of indicia in provided areas of the record slip, the punch indications are preferably performed at the top or head of the form which is away from the operator while writing upon the record form.

To enable easy and quick identification of the punch marks the code areas in which such punch indications are located are blackened, so that the punched out area will present a contrasting appearance to the surrounding area, which enables the location of the punch mark to be more easily observed. Since the manifold copies are necessarily duplicates of each other and if the superposed records were offset, the punch hole made in an overlying record sheet might be made in a differently designated area of an underlying record form, and likewise inscribed indicia written on a certain line of the original or topmost copy may occur on a different line of an underlying offset form copy, provision is made for cooperation of the superposed strips with a cooperating mechanical device by which accurate alignment and registry of the superposed record forms when in recording position is assured by providing configurations of the several superposed forms for engagement of the registering and aligning mechanism.

It is obvious that the record forms, per se, in their original condition, with a plurality of unselected blank, or unidentified record areas, each peculiar to a different business transaction and different merchandise value, and with blank inscription receiving areas convey no information whatever, but are incomplete and without function or result. However, by physical modification of the original blank form by punching portions from selected specific areas previously apportioned to transaction and amount identification and inscribing certain other indicia receiving areas, a definite message is conveyed by the previously incomplete record sheet. Thus the printed matter of the present record forms is per se ineffective, and incomplete, and performs no useful function until the record sheet is physically modified by punching, whereupon the printed matter in conjunction with the physically changed support for the printed matter performs its intended function of conveying a definite unalterable message.

The location of the punch receiving transaction and value identification areas at the tops of succeeding forms avoids interference of the punching device with inscription of the data receiving areas as would be likely to occur if the punch receiving areas were differently disposed on the forms.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. Business transaction record stationery, comprising a continuous strip of record material for use with a combined recording and punching apparatus, longitudinally spaced transverse division lines upon which the strip is divisible into individual sheets, a record receiving area on each sheet appropriated data pertaining to a business transaction, a transverse series of colored punch receiving areas on each sheet, intermediate the record receiving area and the top margin of the sheet, each appropriated to a business transaction of different character, a series of colored punch receiving areas each appropriated to a different mechandise value on each sheet intermediate the record receiving area thereof and the series of colored transaction indicia areas, and a series of longitudinally spaced configurations of the strip for engagement of a strip feeding device, disposed in identical predetermined relation with the inscription and punch receiving areas of each sheet, the construction and arrangement being such that each succeeding individual sheet into which the strip is divisible is presented with the colored areas thereof in exact relation with a sheet punching mechanism to receive in one of the first series of colored areas a punch hole indicative of the character of the transaction and to receive in a colored area of the second series a punch hole indicative of the value of such transaction, and to receive in the inscription receiving area record data pertaining to the transaction, the character and value of which is indicated by the punch holes.

2. Business transaction record stationery comprising a continuous strip of record material, longitudinally spaced transverse weakened lines upon which the strip is divisible into succeeding individual sheets, an inscription receiving area on each sheet spaced from the head of such sheet appropriated to reception of data pertaining to a business transaction, and a series of solidly colored blocks intermediate the inscription receiving area and the top margin of the sheet, each such solidly colored block being appropriated to a business transaction of particular character to be indicated by a punch hole therein, the punch hole being rendered more distinctly visible by the surrounding colored area of the block.

3. Printed form stationery comprising a continuous strip of series connected printed forms for use with a combined recording and punching apparatus having longitudinally spaced marginally punched holes for engagement of a pin type feeding device, longitudinally spaced transverse weakened division lines upon which the strip is divisible into individual sheets, an inscription receiving area upon each sheet appropriated to data pertaining to a business transaction, a series of colored punch receiving spaces contrasting with punch marks when formed therein each appropriated to a transaction of different character, a further series of colored punch receiving spaces appropriated to different valuations of the transactions to which the first series of punch receiving spaces are appropriated, the transaction and valuation punch receiving spaces of succeeding individual sheets being positioned in the same relation with the marginally punched holes of every other individual sheet into which the strip is divisible upon said weakened lines, the construction and arrangement being such that the strip is uniformly advanced and positioned with succeeding individual sheets thereof in identical relation with a sheet punching mechanism to receive a record inscription in the inscription area and to receive punch holes in any one of the transaction appropriated spaces and in any one of the valuation appropriated spaces.

4. Business transaction stationery, including a continuous strip of record material for use with recording and punching apparatus, a series of transverse weakened lines upon which the strip is divisible into a succession of individual sheets, an appropriately designated inscription receiving area on each sheet to receive record data pertaining to a business transaction, a series of colored punch receiving blocks on each sheet, each of which is appropriated to a transaction of different character, and a series of colored punch receiving blocks on each sheet, each of which is appropriated to a different valuation of the transaction, and a succession of longitudinally spaced holes in the strip for accommodation of a strip feeding and arresting means, the holes in succeeding detachable sheet portions of the strip being disposed in like relation with the punch receiving, the construction and arrangement being such that upon advancement the strip is arrested with the colored punch receiving areas in position to receive in at least one colored block of each series a punch hole indicative to the character and valuation respectively of the transaction.

5. A manifolding assembly, including a plurality of superposed sheets of record material having correspondingly positioned holes therein for enabling registry of the sheets one with another and with a record receiving position, a series of appropriately designated colored indicia areas on at least one sheet of the assembly to receive a punch mark therein indicative of particular record to which the punch receiving area is appropriated, the colored punch indicia areas being in predetermined relation with the aforementioned registry holes whereby the colored areas are presented in punch receiving relation with a sheet punching mechanism determined by said registry holes, the colored indicia areas affording distinctive visual contrast with the area of the punch hole therein to facilitate interpretation of the punched sheets.

6. A record sheet, including a plurality of colored punch receiving indicia areas thereon apportioned to different business transactions and monetary values, said sheet having therein locating holes by aid of which the sheet may be accurately positioned with the colored areas thereof in registry with corresponding sheet punching devices, the colored punch receiving indicia areas being such as to afford sufficient contrast between the colored area and the area of a punch hole therein to enable such distinction to be readily observed.

7. A refund slip for returned merchandise comprising a record sheet, a group of punch receiving spaces thereon indicative of the character of the refund transaction, including appropriately designated colored spaces in which to indicate by punch mark, cash, refund, credit on account, and merchandise exchange transactions, an additional group of appropriately designated colored spaces in which to indicate by punch mark the approximate money value of the returned merchandise, and an inscription receiving area including an appropriately designated space for inscription of the actual money value of the returned merchandise, an appropriately designated space for inscription of identification of the merchandise returned, additional appropriately designated spaces for inscription of the reason for return of the merchandise, the identification of the customer to whom refund is made, the reasons for return of the merchandise and the identity of the person by whom the merchandise is returned and an appropriately designated signature space.

8. A stationery assembly for recording successive merchandise credit transactions including a plurality of superposed continuous record strips of series connected detachable record forms for use in an autographic register, which are divisible on longitudinally spaced transverse weakened lines into a series of individual record sheets, each of the strips of series connected detachable forms having a blackened punch receiving area located at the head end of each of the detachable forms thereof affording contrasting appearance with subsequently punched out areas thereof for easy identification appropriately designated to indicate different business transactions, and adjacent thereto an additional series of blackened areas appropriately designated to indicate monetary values and affording contrasting appearance with subsequently punched out areas thereof for easy identification, writing spaces for inscribed indicia upon succeeding forms of the record strips, and a series of configurations of succeeding forms of each of the record strips in uniform relation to the blackened areas thereof for engagement of mechanical strip feeding and aligning devices of an autographic register to effect longitudinal alignment of the strips and registry of the blackened areas and writing spaces of superposed forms of the several strips to insure identity of entries and duplicate punchings of the corresponding forms.

9. A merchandise transaction record form, comprising a printed sheet of a separable succession thereof including a series of blackened areas in proximate relation with the head of the sheet, apportioned to different merchandise transactions and positioned to register with certain sheet punching mechanism, a second series of blackened areas also in proximate relation with the head of the sheet apportioned to different merchandise values and also positioned to register with certain of the sheet punching mechanism, an inscription receiving area also on said sheet, said printed sheet having a punch hole in a selected one of the blackened transaction apportioned blackened areas, and having a second punch hole in a selected one of the blackened merchandise value apportioned areas, said punch holes and the surrounding blackened areas of the sheet having contrasting appearance, and feeding configurations of the sheet positioned in relation with the blackened areas of the sheet uniformly with the blackened areas of other like sheets of the separable succession thereof for cooperation with mechanical registering and aligning devices.

DAVID A. GINSBURG.